March 17, 1970 M. L. FREEMAN 3,501,127
BALL VALVES
Filed April 12, 1966 4 Sheets-Sheet 1

INVENTOR

MATHEW L. FREEMAN

BY Strauch, Nolan, Neale,
Nies & Bronaugh
ATTORNEYS

March 17, 1970   M. L. FREEMAN   3,501,127
BALL VALVES

Filed April 12, 1966   4 Sheets-Sheet 2

INVENTOR
MATHEW L. FREEMAN
BY *Strauch, Nolan, Neale,*
*Nies & Bronaugh*
ATTORNEYS March 17, 1970　　　M. L. FREEMAN　　　3,501,127
BALL VALVES Filed April 12, 1966　　　　　　　　　　　　　4 Sheets-Sheet 3

INVENTOR

MATHEW L. FREEMAN

BY *Strauch, Nolan, Neale,
Nies & Bronaugh*
ATTORNEYS

March 17, 1970 M. L. FREEMAN 3,501,127
BALL VALVES

Filed April 12, 1966 4 Sheets-Sheet 4

INVENTOR
MATHEW L. FREEMAN
BY Strauch, Nolan, Neale,
Nies & Bronaugh
ATTORNEYS

United States Patent Office 3,501,127
Patented Mar. 17, 1970

3,501,127
BALL VALVE
Mathew L. Freeman, Mars, Pa., assignor to Rockwell Manufacturing Company, Pittsburgh, Pa., a corporation of Pennsylvania
Continuation-in-part of application Ser. No. 527,291, Feb. 14, 1966. This application Apr. 12, 1966, Ser. No. 542,064
Int. Cl. F16k 5/06, 25/00
U.S. Cl. 251—175
26 Claims

ABSTRACT OF THE DISCLOSURE

A valve assembly having a ported ball type valve plug rotatably mounted in a valve body cavity between upstream and downstream fluid flow passages and having at least one annular, protruding, elastically deformable sealing lip defined along its inner periphery by an annular groove in fluid communication with an opening axially outwardly toward the upstream passage when the plug is turned to its fluid-blocking position. Upstream fluid entering the groove applies pressure to the inner periphery of the lip to firmly deform the lip in sealing relation against a mating surface in the valve body. A second optional lip coaxial with the valve stem is deformed against the interior of the valve body to provide a seal surrounding the valve stem and is defined by a further annular groove opening radially outwardly relative to the rotational axis of the stem.

---

This is a continuation-in-part of my copending application Ser. No. 527,291 filed on Feb. 14, 1966 for Ball Valves.

The invention herein relates to improvements in ball type valves and is especially concerned with improvements in valve ball seals.

Conventional ball valves are customarily provided with a pair of seat ring assemblies for rotatably supporting a ball plug in a valve body cavity. Typically, these seat assemblies each comprise an elastomeric seat ring engaging the plug periphery and held in place by rigid retaining ring which is mounted in the valve body cavity. The valve plug is rotatable on the seating surfaces of the seat rings which provide plug-to-retaining ring seals surrounding the inner ends of the fluid inlet and outlet passages in the valve body. Usually, separate sealing members, such as O-rings, are required to provide retaining ring-to-body seals for preventing fluid leakage. In this type of seat ring seal construction it is also customary to effectively energize the seat ring-to-plug seals by compressing the seat rings against the valve plug periphery with some form of spring washer. The spring washer in biasing the seat rings against the ball plug provides an initial seal under zero fluid pressure differential conditions. To obtain a greater seating force as the fluid pressure differential across the seat-to-ball interface is increased, conventional valves are constructed to pressure energize the seat rings.

From the foregoing description it will be appreciated that several parts are needed for rotatably supporting the ball plug, providing sealing surfaces around the inner ends of the valve body passages, providing an initial seal at zero fluid pressure differential, and providing a greater sealing force as the fluid pressure differential increases.

It is a primary object of this invention to provide an improved ball valve which efficiently performs all of the foregoing functions, but with fewer parts to thus simplify and reduce costs of manufacture. In one embodiment of this invention, all of the functions mentioned above are combined into a single part made from the same material.

A more specific object of this invention is to provide a ball type valve plug with a novel lip seal construction which is effective to establish an initial seal at zero fluid pressure and which utilizes fluid pressure to increase the sealing force as the pressure increases.

Still another object of this invention is to provide a ball type plug with a novel lip seal which seats directly on the interior body wall surface to eliminate the need for separate plug supporting seat rings.

A further object of this invention is to provide a novel one-piece elastomeric valve ball embodying the lip seal structure mentioned in the previous objects and being constructed for insertion into the valve body cavity through one of the fluid passages opening into the cavity.

Still another object of this invention is to provide a novel ball type valve plug having a pair of sealing lips which seal upstream pressure on both seats and downstream pressure on both seats.

Another more specific object of this invention is to provide a novel ball type valve plug having a pair of axially spaced lip seals which are pressure energized to seal against fluid entering the valve plug cavity from opposite directions.

Still another specific object of this invention is to provide a novel ball type valve plug having a pair of axially spaced lip seals which face in the same direction to be energized by fluid pressure from the same valve body passage, the downstream lip seal being activated when the upstream lip seal becomes defective.

A further object of this invention is to provide a novel seal for preventing leakage between the valve body and the valve operating stem.

Further objects of this invention will appear as the description proceeds in connection with the appended claims and annexed drawings wherein:

Figure 1:
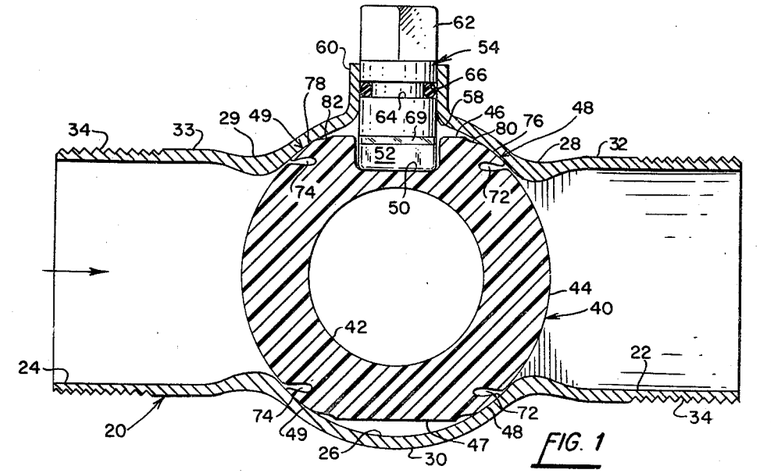
FIGURE 1 is a longitudinal section of a ball valve assembly constructed according to a preferred embodiment of this invention.
Figures 2, 3:
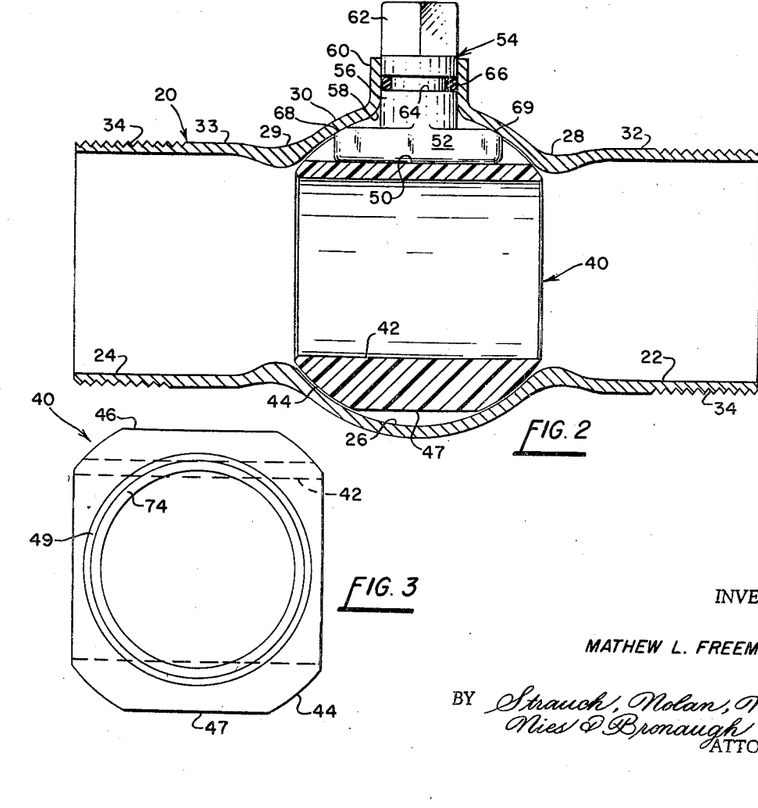
FIGURE 2 is a longitudinal section illustrating the valve of FIGURE 1 in its opened position.
FIGURE 3 is a side elevation of the ball type plug shown in FIGURES 1 and 2.

Referring now to the drawings and more particularly to FIGURES 1 and 2, the valve according to a preferred structural embodiment of this invention, comprises a rigid one-piece body 20 having opposed axially aligned, similar, cylindrical fluid flow passages 22 and 24 on opposite sides of an enlarged plug receiving cavity or chamber 26. The valve, as shown in this embodiment, is a two-way valve, and, for purposes of this disclosure, passage 22 may be considered to be on the outlet or downstream side and passage 24 may be considered to be on the inlet or upstream side.

As shown in FIGURE 1, body 20 is of generally tubular configuration and is formed with reduced diametered necked sections 28 and 29 at the juncture of passages 22 and 24 with chamber 26. Between necked sections 28 and 29, body 20 is formed with a spherically bulged section 30 which defines chamber 26. Necked sections 28 and 29 integrally join section 30 to uniformly diametered tubular end sections 32 and 33 which are externally threaded at 34 for attachment to a pipeline.

The diameters of passages 22 and 24 respectively defined by tubular sections 32 and 33 are preferably equal to the internal diameter of the pipeline in which the valve of this invention is installed and are greater than the internal throat diameters defined by necked sections 28 and 29. Necked sections 28 and 29 are formed with inverse curvatures relative to bulged section 30. Passages 22 and 24 are thus provided with gradually converging inner end sections terminating in fluid inlet and outlet ports at the throats defined by necked sections 28 and 29.

Still referring to FIGURE 1, chamber 26 is formed with a substantially spherical internal wall surface which smoothly merges with the interior of each of the necked sections at a point where a tangent line is common to the radii of curvature of the bulged section and each necked section. Body 20 is thus formed with a continuous, smooth internal contour which is free of abrupt changes of configuration, sharp edges, recesses, and pockets.

Preferably, the wall thicknesses of tubular sections 32 and 33 are uniform and equal to the wall thickness of the pipeline for which the valve is sized. These sections thus have the same pressure and temperature ratings as applied to the pipeline when body 20 is formed from the same material. To meet code requirements and to provide a uniform stress, the thickness of necked sections 28 and 29 are somewhat greater than sections 32 and 33. The wall thickness of section 30 is uniform and advantageously somewhat less than the wall thickness of sections 28, 29, 32 and 33. Since section 30 is formed with a spherical configuration as compared with the tubular configurations of sections 28, 29, 32, and 33, however, it has the same pressure rating as sections 28, 29, 32, and 33. From the standpoint of a pressure vessel, therefore, all sections of body 20 are substantially at the same stress level. Highly efficient use of valve body material is thus obtained.

Owing to its configuration, body 20 may be conveniently shaped from ductile pipe or tubing by conventional forming methods such as, for example, hydraulic forming. The tubing or pipe from which body 20 is formed preferably is of the same nominal size and has the same wall thickness as that of the pipeline for which the finished valve is sized. By distending a central portion of the pipe or tubing to form chamber 26, the desired reduced wall thickness of section 30 is readily obtained. The necking operation for forming sections 28 and 29 collapses material radially inwardly with the result that the thickness of sections 28 and 29 will be greater than that of sections 32 and 33 to obtain the desired uniformity of stress.

In accordance with this invention, a ball plug 40 rotatably received in chamber 26 is formed preferably in one piece from a suitable elastomeric material and has a uniformly diametered, cylindrical through bore defining a port 42. The diameter of port 42 is closely equal to the fluid passage throat diameter at necked sections 28 and 29 to avoid flow retarding restrictions. When the valve is open, as shown in FIGURE 2, port 42 is substantially continuous with passages 22 and 24. At opposite ends, port 42 terminates in the plug spherical surface 44 which preferably otherwise comprises the entire outer surface of plug 40 except for top and bottom flats 46 and 47 and sealing lips 48 and 49. Flats 46 and 47 are advantageous since they reduce the amount of material needed to form plug 40. Any suitable elastomeric material may be used to form plug 40 such as, for example, polyurethane, nylon, or Teflon.

At its upper end, plug 40 is formed with a flat-bottomed, flat-sided, straight, upwardly opening groove 50 for receiving a T-shaped, flat-sided tang 52. Groove 50 extends parallel with the axis of port 42 and is medially intersected by a vertical plane containing the port axis. Tang 52 is formed with a rectangular cross-section and is integral with a valve stem 54 having a cylindrical trunnion section 56. Stem 54 extends coaxially through a circular opening 58 in section 30 and through a bearing collar 60 along an axis that substantially normally intersects the longitudinal axis of port 42. The upper end of stem 54 protruding beyond collar 60 terminates in a square section 62 to facilitate engagement by a wrench or other suitable tool for turning stem 54 and, consequently, plug 40 about an axis that is substantially normal to the fluid flow through chamber 26. Collar 60 advantageously is formed integral with body 20 and extends radially outwardly from section 30.

With continuing reference to FIGURES 1 and 2, stem section 56 is journalled in collar 60 and is formed with an annular, outwardly opening groove 64 for receiving a resilient O-ring 66. O-ring 66 is compressed against the internal wall of collar 60 to establish a fluid-tight seal between stem 54 and body 20. When torque is applied to the upper end of stem 54, plug 40 is rotated about its central axis through engagement of the sides of tank 52 with the sides of groove 50. The opened and closed position of the valve shown in FIGURES 1 and 2 are spaced 90 degrees apart.

The ends of tank 52 extend beyond opposite sides of opening 58 and terminate in upwardly facing shoulders 68 and 69. Sholders 68 and 69 provide bearing surfaces which seat against the internal wall of bulged section 30 and prevent the integral tang and stem piece from being blown out by internal fluid pressure.

In the valve body construction of this invention, the interior of tubular sections 32 and 33 and all of the openings into chamber 26 are appreciably smaller than the maximum diameter of plug 40. Plug 40 is inserted into chamber 26 by forcing it through either passage 22 or passage 24 in the manner described in my copending application Ser. No. 527,291 filed Feb. 14, 1966.

Still referring to FIGURES 1–3, surface 44 of plug 40 is contained in a spherical envelope having a uniform diameter which preferably is slightly smaller than the spherical diameter of chamber 26. This provides for a small clearance between surface 44 and the internal, spherical wall surface of body section 30.

In accordance with this invention, plug 40 is provided with two annular grooves 72 and 74 opening in axially opposite directions and defining sealing lips 48 and 49 respectively. Lips 48 and 49 are identical in construction and are raised relative to surface 44 to provide annular seating surfaces 76 and 78. Surfaces 76 and 78 are each contained in uniformly diametered annuli extending about a common axis that normally intersects the longitudinal axis of port 42 medially between opposite ends thereof. Grooves 72 and 74 are concentric about the same axis. By containing surfaces 76 and 78 in annuli of uniform diameter, the cross section of each sealing surface is inclined preferably at an angle of 30 degrees with a plane which normally interesects the rotational axis of plug 40.

The ends of lips 48 and 49 remote from the mouths of grooves 72 and 74 respectively terminate in sloped heels 80 and 82. Heels 80 and 82 provide junctures between the peripheral plug surface 44 and surfaces 76 and 78 respectively. Since plug 40 is relieved to provide a clearance between surface 44 and the interior wall of body section 30, only lips 48 and 49 seat against the interior body wall surface under zero or negligible fluid pressure differential conditions.

Figures 4, 8:
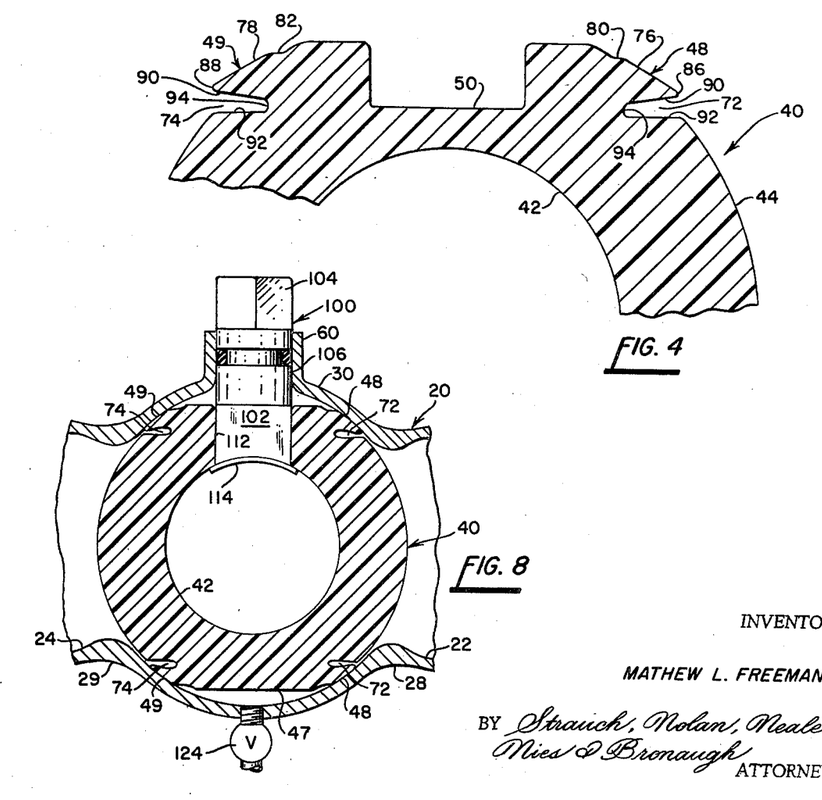
FIGURE 4 is an enlarged transverse section of the ball type plug shown in FIGURE 3.
FIGURE 8 is a fragmentary longitudinal section illustrating a modification of the ball valve assembly shown in FIGURE 5.

As best shown in FIGURE 4, the ends of lips 48 and 49 adjacent to the mouths of grooves 72 and 74 terminate in rounded corners 86 annd 88 respectively. Corner 86 joins surface 76 with an annular side wall 90 which defines the outer periphery of groove 72 and the underside of lip 48. The inner periphery of groove 72 is defined by an annular side wall 92. At its inner end, groove 72 is formed with a uniformly diametered rounded bottom 94 which joins side walls 90 and 92. In the cross-sectional plane taken at right angles to the longitudinal axis of port 42 as shown in FIGURE 4, the cross-section of side wall 92 is contained in a horizontal plane extending at right angles to the rotational axis of plug 40. Side wall 90 is inclined outwardly by about 7½ degrees to the horizontal plane normally intersecting the plug rotational axis. With this construction, it is clear the groove 72 diverges axially outwardly, whereas the thickness of lip 48 tapers towards end 86 and in the direction of divergence of groove 72.

The configuration of groove 74 is the same as that just described for groove 72, like reference numerals being used to identify like surfaces. All of the annular surfaces defining grooves 72 and 74 and lips 48 and 49 concentrically extend about a common axis which is at right angles to the longitudinal axis of port 42.

When plug 40 is centered in cavity 26, sealing surfaces 76 and 78 are compressed against the internal wall surface of body section 30. The diameter of lips 48 and 40 approaching the ends 86 and 88 is increasingly greater then the internal spherical diameter of body section 30 with the result that the ends of lips 48 and 49 are deflected or flexed into grooves 72 and 74 respectively. Lips 48 and 49, being formed from elastomeric material, are thus placed under tension to resiliently effect initial plug-to-body seals at zero fluid pressure differential.

The diameters of sealing surfaces 76 and 78, each being uniform, increase relative to the spherical diameter of cavity 26 in a direction approaching the ends of the lips. Thus, lips 48 and 49 are compressed into grooves 72 and 74 with a pressure that increases in the direction approaching ends 86 and 88. Preferably, the volume of grooves 72 and 74 are less than the unflex volumes of lips 48 and 49 that would extend beyond the internal spherical radius of chamber 26. Thus, when plug 40 is mounted in place within body section 30 to flex lips 48 and 49 into grooves 72 and 74, the elastomeric material forming lips 48 and 49, being placed in tension, tends to resiliently spring out to produce an additional compression force causing lips 48 and 49 to more tightly contact the interior wall surface of body section 30.

When plug 40 is turned 90 degrees from its valve opened position shown in FIGURE 2 to its valve closed position shown in FIGURE 1, the longitudinal axis of port 42 extends at right angles to the aligned axes of passages 22 and 24. In this fluid blocking position, lips 48 and 49 engage the inner spherical periphery of chamber 26 surrounding the inner ends of passages 22 and 24 to respectively establish downstream and upstream annular seals which are concentric about an axis aligning with the axes of passages 22 and 24. In valve closed position, groove 72 opens axially outwardly towards the inner end of passage 22 and groove 74 opens axially in the opposite direction towards the inner end of passage 24. High pressure fluid in the upstream passage 24 flows through the clearance between plug surface 44 and the interior wall surface of body 20 and into groove 74 to apply pressure to the underside of lip 49, thus compressing it further against the interior wall surface of the body. If fluid flow through body 20 is reversed, then high pressure fluid enters groove 72 to compress lip 48 against the interior wall surface of body section 30.

The diameters of heels 80 and 82 are greater than or at least equal to the internal diameter of body section 30. Heels 80 and 82 support their adjacent lips and prevent extrusion thereof at high differential pressure loads. In addition, heels 80 and 82, by being compressed against the interior of body section 30, provide a secondary annular seal behind lips 49 and 48 respectively.

In the embodiment shown in FIGURE 1, sufficient clearance is provided between tang 52 and groove 50 to allow plug 40, when in valve closed position, to be displaced under the influence of differential pressure loads in a downstream direction. This downstream floating action increases the compression of lip 48 against the interior wall surface of body section 30 to thereby increase the fluid sealing force. Further increase in the differential pressure load across cavity 26 flexing lip 48 into groove 72 compresses heel 80 into the body of plug 40, resulting in the engagement of the downstream region of plug periphery 44 with the interior body wall surface.

Thus, it will be appreciated that an upstream lip seal plus a supporting heel seal is provided by lip 49 and that a secondary body-to-heel downstream seal is provided by heel 80. As the fluid pressure differential increases, a further downstream seal is provided by causing the periphery 44 of plug 40 to engage the interior downstream wall surface of body section 30 when heel 80 deforms into the elastomeric material of plug 40.

In the event of a build-up of fluid pressure in chamber 26 when plug 40 is in its valve closed position, the pressure of the fluid is applied to heel 80 to distort the heel inwardly and thus provide for a fluid passage whereby the fluid pressure in chamber 26 causes lip 48 to be flexed into groove 72. When this occurs, fluid communication is established between chamber 26 and the downstream passage 22 to relieve the excess fluid pressure built up in chamber 26. After the excess fluid pressure is dissipated in this manner, lip 48, being under tension as a result of having been flexed into groove 72, is resiliently biased outwardly to again seal with the interior wall surface of body section 30.

From the foregoing description it will be appreciated that all the functions associated with conventional, multiple component valve plug and seating assemblies are more efficiently performed by the one-piece wall plug of this invention.

Figure 5:
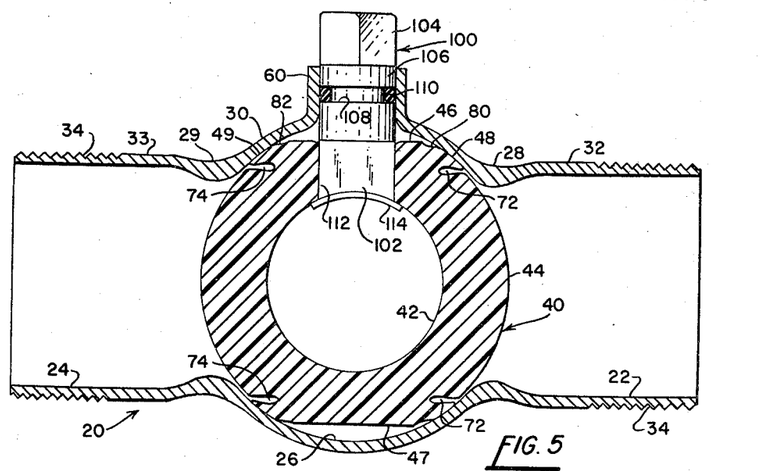
FIGURE 5 is a longitudinal section of a ball valve assembly constructed according to another embodiment of this invention.

In the embodiment shown in FIGURE 5, the stem tang illustrated in FIGURES 1–3 is replaced with a rigid valve operating stem 100 which extends coaxially through collar 60 and which is formed at opposite ends with a drive tang section 102 and a tool engaging section 104. Sections 102 and 104 are essentially square in cross-section and are integrally joined together by an intermediate, cylindrically smooth, trunnion section 106. Trunnion section 106 is journalled in collar 60 and is formed with an annular outwardly opening recess 108 in which a resilient O-ring 110 is seated. O-ring 110 is compressed against the internal periphery of collar 60 to establish a fluid-tight seal between stem 100 and body 20. Section 104 projects outwardly beyond the collar 60 for convenient engagement by a suitable tool. Section 102 is received in a rectangular hole 112 formed through plug 40 along an axis normally intersecting the longitudinal axis of port 42. Plug 40 is thus turned between its valve opened and valve closed positions through bearing engagement of the side faces of section 102 with the opposing flat side surfaces of hole 112.

Figure 6:
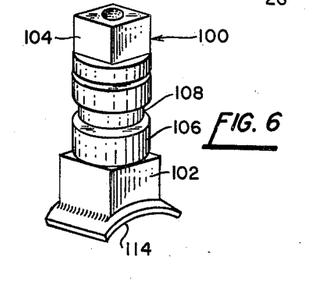
FIGURE 6 is a perspective view of the valve operating stem shown in FIGURE 5.

As shown in FIGURES 5 and 6, the inner end of drive tang section 102 terminates in a rectangularly contoured relatively thin shoulder 114. Shoulder 114 extends beyond the edges of hole 112 and is curved on all of its four sides to interfittingly seat against the internal periphery of port 42. Shoulder 114 thus provides a stop abutment surface for limiting axial outward displacement of stem 100 and is sufficiently thick to prevent stem 100 from being blown out of valve body 20 by internal fluid pressure. The internal periphery of shoulder 114 is a smooth, segmental, cylindrical surface extending in concentric and interfitting relation with the internal wall surface of port 42. Sufficient clearance is provided between hole 112 and tang 102 to allow plug 40 to float against its downstream seal as previously described.

Figure 7:
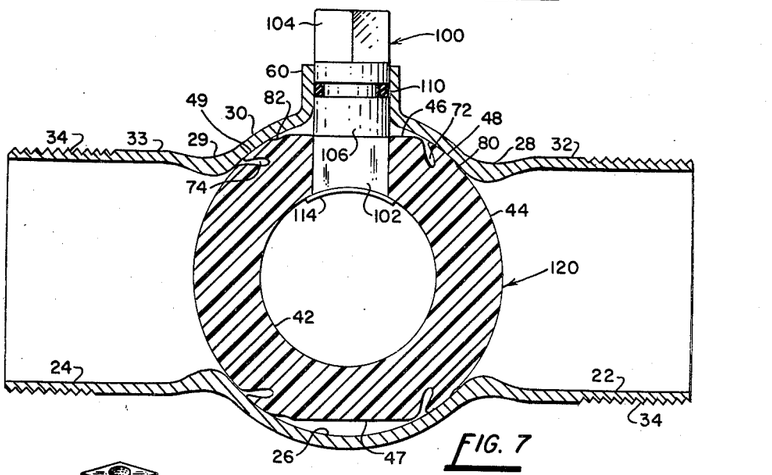
FIGURE 7 is a longitudinal section of a ball valve assembly constructed according to still another embodiment of this invention.

In the embodiment shown in FIGURE 7, plug 40 is replaced with a modified elastomeric valve plug 120. To the extent that plugs 120 and 40 are alike, like reference numerals have been used to identify like parts.

In the embodiment of FIGURE 7, the construction of grooves 72 and 74 and of lips 48 and 49 are the same. The arrangement of groove 74 and lip 49 together with heel 82 to provide a primary upstream seal is also the same as previously described. The arrangement of groove 72 and lip 48, however, has been changed such that groove 72 opens radially outwardly on the downstream side of stem 100 and lip 48 is disposed on the downstream side of groove 72. In this embodiment, therefore, lips 48 and 49 face circumferentially in the same direction.

As previously described, upstream fluid pressure in passage 24 enters groove 74 to compress lip 49 and heel 82 against the interior wall periphery of body section 30 to establish a primary upstream seal surrounding the inner end of passage 24. If this seal becomes defective, high pressure fluid flows through the clearance between plug surface 44 and the interior body wall surface to enter groove 72, thus compressing lip 48 radially against the internal body wall surface of section 30. As this internal pressure increases, heel 80, which is compressed against the interior body wall surface, is deformed into the elastomeric plug material with the result that the plug surface 44 will be compressed against the downstream internal wall surface in chamber 26. In effect, therefore, four seals are provided by lips 48 and 49 and heels 80 and 82 to prevent fluid leakage from the upstream fluid passage 24 to the downstream passage 22. By rotating plug 120 180 degrees from the position shown in FIGURE 7, these same seals are effected when the flow of fluid is reversed. Thus plug 120 seals only in only one direction when rotated 90 degrees from its valve opened position, whereas plug 40 seals in both directions for the same degree of rotation.

Referring now to FIGURE 8, a bleed valve 124 may be connected to body section 30 for venting chamber 26 to atmosphere to reduce the operating torque needed for turning the valve plug 40 from closed to opened position. In normal operation, valve 124 is closed. Under this condition, the upstream fluid pressure usually will be greater than the downstream fluid pressure which is equal to the fluid pressure in chamber 26 when plug 40 is turned to its valve closed position as illustrated in the drawings. With valve 124 closed and plug 40 in its closed position, therefore, plug 40 will be shifted downstream by the differential fluid pressure to seat the plug periphery 44 against the interior wall surface of body section 30, thereby providing an expanded downstream seal, but increasing the torque needed for turning plug 40 from its valve closed position to its valve opened position.

When plug 40 is in its valve closed position, valve 124 may be opened to thus reduce the chamber pressure between lips 48 and 49 to atmospheric pressure. The opposing upstream and downstream fluid pressures acting on opposite sides of plug 40 when substantially equal will center plug 40 in chamber 26 so that only lips 48 and 49 and heels 80 and 82 will contact the interior wall surface of body section 30. The plug surface 44 therefore will be out of contact with the interior body wall surface to thus reduce the torque needed for turning plug 40 to its valve opened position.

A more important function of valve 124 and the primary reason for placing it on valve body 30, is in double block and bleed service. In this type of service, when plug 40 is in its closed position, valve 124 is opened in order to drain off any minute amount of leakage from either side of the plug 40 into body chamber 26. This prevents any possible contamination if it is desired to isolate fluids in passages 22 and 24 from each other. This valve 124 additionally provides a check on the efficacy of the seals, by venting any leakage to atmosphere where it can be detected.

Figure 9:
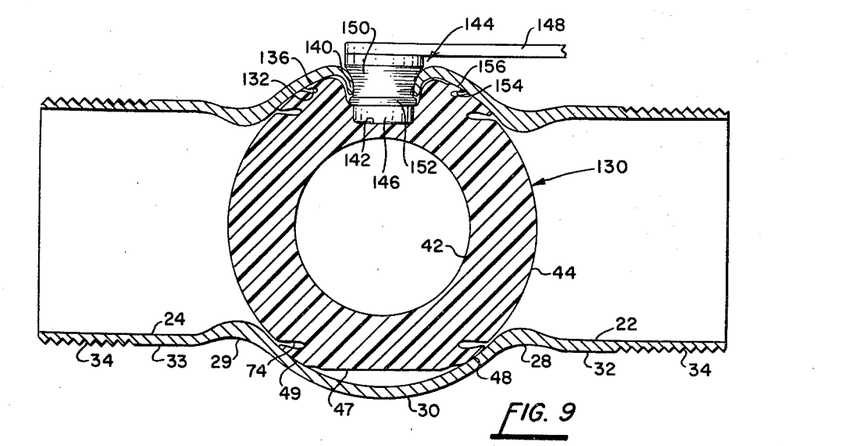
FIGURE 9 is a longitudinal section of a ball valve assembly illustrating the novel valve operating stem seal of this invention.

FIGURE 9 illustrates a modified elastomeric ball type plug 130 which is constructed to eliminate the O-ring seal around the valve operating stem. Plug 130 is the same as plug 40 shown in FIGURES 1–5 except that an additional annular groove 132 is formed in the plug to provide an annular lip 136. Lip 136 seats against the internal periphery of body section 30 in circumferential surrounding relation to the stem axis.

Groove 132 and lip 136 are of the same construction as grooves 72 and 74 and lips 48 and 49. As shown, groove 132 and lip 136 are substantially concentric about the rotational axis of stem 100. The stem rotational axis is at right angles to the common axis of concentricity for grooves 72 and 74. Groove 132 opens radially outwardly from the stem rotational axis.

In the embodiment of FIGURE 9, the outwardly extending body collar 60 is replaced with a collar 140 which extends radially inwardly from the outer periphery of body section 30 and which is received in the upper end of an outwardly opening operating stem groove 142. Groove 142 is formed in plug 130 and is elongated in the direction of the longitudinal axis of the plug port. The side walls of groove 142 are sloped outwardly to provide groove 142 with a diverging mouth for interfittingly receiving collar 140 which is formed integral with body section 30. A valve operating stem 144 extends through collar 140 and terminated at its inner end with a rectangular drive tang section 146 which is seated in the bottom of groove 142. Groove 142 is formed with a flat bottom which is perpendicular with upstanding side wall portions that interfittingly mate with tang section 146. The upper end of operating stem 144 is provided with a handle 148 and is integrally joined to tang section 146 by a trunnion section 150. Trunnion section 150 is journalled in collar 140 and is formed with a cylindrically smooth surface which is contained in a conical envelope to interfit with collar 140.

Between sections 150 and 146, stem 144 is formed with a radially extending annulus 152 which projects beyond the inner, annular end of collar 140. Annulus 152 seats against the inner end of collar 140 to limit outward displacement of stem 144 and thus prevent the stem from being blown out by the pressure of fluid in valve body 20.

Pressure differential between the line fluid and atmosphere acts upon the relatively thin section of urethane between the flow port 42 and groove 142 creates pressure on the stem which is resisted by the engagement of annulus 152 with collar 140.

By engaging the interior wall surface of body section 30, lip 136 is flexed partially into groove 132 and provides a fluid tight annular seal peripherally surrounding stem 144.

Flexure of lip 136 into groove 132 provides an initial seal at zero fluid pressure as previously described with respect to lips 48 and 49. When plug 130 is turned to its opened position high pressure fluid from passage 24 passes through the clearance between the plug periphery 44 and the interior of body section 30 to enter groove 132 and thereby compress lip 136 against the interior body wall surface. The fluid pressure will be trapped in groove 132 when plug 130 is turned to its closed position shown in FIGURE 9. Thus, an effective annular seal is provided to prevent leakage of fluid between the valve body and stem 144.

In further accordance with this invention, sufficient clearance is provided between plug 130 and collar 140 to allow plug 130, when in its valve closed position, to shift downstream and float against its downstream seat under the influence of pressure differential loads across chamber 26. Lip 136 simply slides against the smooth interior body wall surface allowing plug 130 to float in a downstream direction while keeping a tight seal for preventing fluid leakage between stem 144 and collar 140.

In constructing the valve shown in FIGURE 9, the ball plug and the valve body are first separately formed. After the plug 130 is inserted into chamber 26 in the manner disclosed in the aforesaid copending application, the wall surface of body section 30 is turned inwardly to form collar 140. Stem 144 is then inserted through collar 140 to seat tang section 146 in the bottom of groove 142. Alternatively, the body material forming collar 140 may be turned inwardly simultaneously with the insertion of stem 144. It will be appreciated that this unique valve body, stem, and valve plug structure in eliminating the need for a stem seal materially reduces the costs of manufacture. This construction is especially useful for chemical service which often requires the use of Teflon in forming plug 130.

Figure 10:
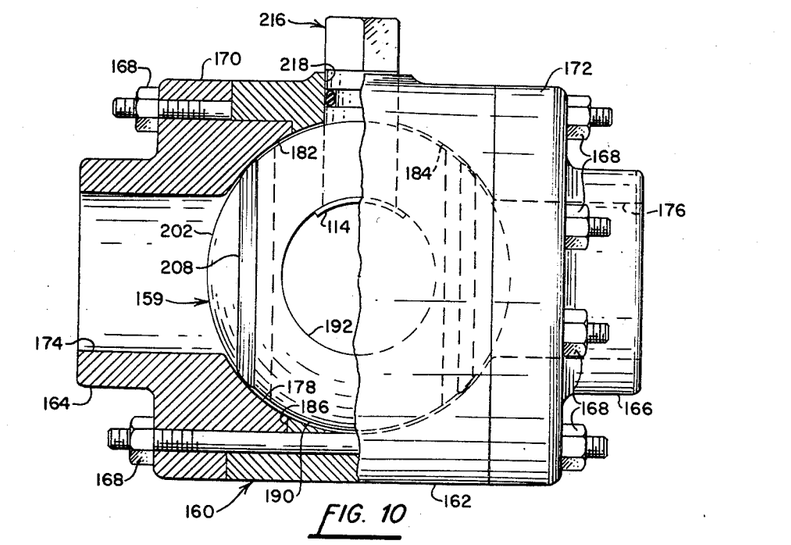
FIGURE 10 is a partially sectioned side elevation of a ball valve assembly constructed according to still another embodiment of this invention.
Figure 11:
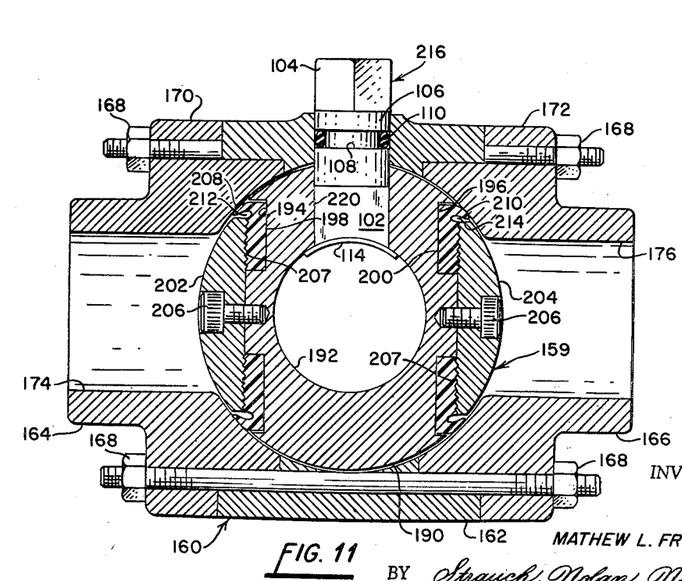
FIGURE 11 is a longitudinal section of the ball valve assembly shown in FIGURE 9.

In the embodiment shown in FIGURES 10 and 11, a modified ball plug structure 159 is mounted in a jointed valve body 160. Body 160, as shown in FIGURE 10, comprises a central section 162 which is rigidly clamped between two end sections 164 and 166 by stud and nut assemblies 168. The studs of assemblies 168 extend through axially aligned bores formed in axially spaced apart, radial flanges 170 and 172. Flanges 170 and 172 are respectively formed integral with sections 164 and 166.

Still referring to FIGURE 10, sections 164 and 166 are respectively formed with axially aligned, cylindrically smooth, through bores which define fluid inlet and outlet passages 174 and 176. Passages 174 and 176 open at their inner ends into a valve plug cavity 178.

The inner ends of sections 164 and 166 are formed with opposed, segmental spherical surfaces 182 and 184 respectively surrounding the inner ends of passages 174 and 176 and delimiting cavity 178. Section 162 is formed with a radially inwardly extending annular portion 186 which is interfittingly received between axially opposed ends of sections 164 and 166. The inwardly facing annulus of portion 186 has a segmental, spherical contour delimiting cavity 178 and providing a smooth, uniformly diametered continuation of surfaces 182 and 184. Cavity 178 thus is of uniformly diametered spherical configuration.

As best shown in FIGURE 11, plug structure 159 comprises a rigid central member 190 having a cylindrically smooth, through bore which defines a fluid port 192. Member 190 is formed on opposite sides of port 192 with oppositely facing, flat bottomed, annular grooves 194 and 196. The flat bottom surfaces of grooves 194 and 196 are contained in parallel planes which are intersected by a plane containing the longitudinal axis of port 192.

Interfittingly seated in grooves 194 and 196 are annular, elastomeric, axially aligned sealing rings 198 and 200 which may be made from the same materials previously mentioned in connection with the description of plug 40. Sealing rings 198 and 200 are firmly clamped in grooves 194 and 196 by seal retaining rings 202 and 204 respectively. Rings 202 and 204 are removably fixed to member 190 by screws 206. The inwardly facing surfaces of rings 202 and 204 are advantageously roughened as indicated at 207 to firmly grip sealing rings 198 and 200. The external periphery of plug structure 159 along member 190 and rings 202 and 204 is of uniformly diametered spherical contour.

With continuing reference to FIGURE 11, sealing rings 198 and 200 are respectively formed at their outer peripheries with annular sealing lips 208 and 210. Lips 208 and 210 are of the same construction as lips 48 and 49 and project in axially opposite directions beyond grooves 194 and 196. Radially inwardly of lips 208 and 210, sealing rings 198 and 200 are respectively undercut to provide grooves 212 and 214 which open axially in opposite directions and which are concentric about a common axis normally intersecting the longitudinal axis of port 192. The outer peripheries of grooves 212 and 214 are delimited by the inner peripheries of lips 208 and 210 respectively.

Lips 208 and 210 extend axially outwardly to circumferentially surround the adjacent ends of retaining rings 202 and 204 respectively. With this construction, the mouths of grooves 212 and 214 are delimited by the tips of lips 208 and 210 and the adjacent ends of rings 202 and 204. The configuration of grooves 212 and 214 is the same as that described for grooves 72 and 74. Also the functions of lips 208 and 210 and grooves 212 and 214 are the same as that explained for lips 48 and 49 and grooves 72 and 74.

As shown in FIGURES 10 and 11, a valve operating stem 216 rotatably extends through a bore 218 which is formed in section 162 along an axis medially intersecting cavity 178. Stem 216 is of the same construction as stem 100, like reference numerals being used to identify like parts.

As shown, section 102 of stem 216 is received in a mating, essentially rectangular hole 220 formed through member 190 along an axis normally intersecting the longitudinal axis of port 192. Plug structure 159 is rotatable by stem 216 between its valve opened and closed positions which are angularly spaced apart by 90 degrees.

When plug structure 159 is in its valve closed position as shown in FIGURE 10, lips 208 and 210 respectively seat against surfaces 182 and 194 to provide annular seals surrounding the inner ends of passages 174 and 176. By engaging these seating surfaces, lips 208 and 210 are flexed inwardly to tension the elastomeric material and thereby provide initial fluid tight seals under zero fluid pressure differential load conditions in the same manner as described in the embodiments of FIGURES 1–5. Also, a clearance is provided between the periphery of plug structure 159 and the interior body wall surface defining cavity 178 so that grooves 212 and 214 are respectively in fluid communication with passages 174 and 176 when the plug structure is turned to its illustrated, valve closed position.

High pressure fluid in passage 174 enters groove 212 to compress lip 208 against surface 182. When fluid flow is reversed, high pressure fluid enters groove 214 to compress lip 210 against surface 184. This compression of lips 208 and 210 against their body seating surface by fluid pressure in passages 174 and 176 is thus accomplished in the same manner as described in connection with the embodiments of FIGURES 1–5.

Advantageously, sufficient clearance may be provided between stem section 102 and the wall surface of hole 220 to allow plug structure 159 to float against its downstream seat under the influence of a fluid pressure differential across cavity 178. The valve structure of FIGURES 10 and 11 may also be provided with a suitable bleeder valve such as valve 124 to vent the cavity space between lips 208 and 210 as in the previously described block and bleed operation.

The embodiment shown in FIGURES 10 and 11, while retaining the benefits of the particular lip seal disclosed in this application, is particularly useful in services requiring an extremely high working (and differential) pressure. In these services, it is conceivable that the elastomeric ball might be deformed out of position, and thus fail in extreme service. The embodiment of FIGURES 10 and 11 would be useful in this case.

What is claimed and desired to be secured by Letters Patent is:

1. In a valve having a body formed with fluid inlet and outlet passages opening at their inner ends into a valve plug cavity, a ported, ball type plug structure rotatable within said cavity between positions where it respectively blocks and provides fluid communication between said passages, and an operating stem rotatably extending into said body and being operatively connected to rotate said plug structure between said positions, the improvement comprising at least one annular, elastically deformable sealing lip protruding from said plug structure and extending in coaxial relation about an axis normally intersecting the longitudinal axis of the port in said plug structure, said lip being engageable with a seating surface in said cavity to provide an annular seal surrounding the inner end of one of said passages when said plug structure is rotated to its fluid-blocking position, said plug structure having a uniformly diametered spherical periphery at least in the regions surrounding opposite ends of said port, and at least the tip of the said lip extending beyond said spherical periphery, said lip, by engaging said seating surface, being compressed and flexed inwardly under tension to provide an initial seal at zero fluid pressure differential across said plug structure, said plug structure being undercut to define with said lip an annular, outwardly opening groove disposed inwardly of and concentrically with said lip, and said lip being flexed at least partially into said groove by engagement with said seating surface, there being a clearance between said plug structure and the interior body wall surface defining said cavity to establish fluid communication between one of said passages and said groove, with the pressure of fluid entering said groove being effective to compress said lip against said seating surface.

2. The valve defined in claim 1 wherein said groove opens axially towards said upstream passage and is in fluid communication with said upstream passage when said plug structure is in its fluid blocking position.

3. The valve defined in claim 2 wherein said plug structure comprises a one-piece elastically deformed member having a through bore defining said port.

4. The valve defined in claim 2 wherein said seating surface is a part of the interior body surface defining said cavity.

5. The valve defined in claim 3 wherein said seating surface is a part of the interior body surface defining said cavity and wherein said interior body surface has a uniformly diametered, spherical contour at least in the regions surrounding the inner ends of said passage.

6. The valve defined in claim 5 wherein the cross section of said lip converges towards the outer end of said lip, and wherein said groove diverges towards its mouth, the underside of said lip defining the outer periphery of said groove.

7. The valve defined in claim 6 wherein the outer seating surface of said lip is contained in an annulus of substantially uniform diameter.

8. The valve defined in claim 3 wherein said elastically deformable member is formed with a further outwardly opening groove and wherein said stem terminates at its inner end in a tang section received in said further groove.

9. The valve defined in claim 3 wherein said stem is formed with a non-circular section which is interfittingly received in a non-circular hole formed through said elastically deformable member along an axis substantially normally intersecting the longitudinal axis of said port.

10. The valve defined in claim 2 comprising a second elastically deformable sealing lip protruding from said plug structure and defining therewith a second annular outwardly opening groove, said first named and second lips and said first named and second grooves being coaxial about a common axis, said second lip being engageable with a further seating surface in said cavity to provide an annular seal surrounding the inner end of the other of said passages, said second lip being compressed and inwardly flexed at least partially into said second groove by engagement with said further seating surface to provide an initial seal at zero fluid pressure differential.

11. The valve defined in claim 10 wherein said plug structure comprises a one-piece elastically deformable member formed integral with said lips and having a through bore defining said port.

12. The valve defined in claim 11 wherein said cavity is delimited by a spherical interior body surface at least in the regions surrounding the inner ends of said passages and wherein said first named and further seating surfaces are a part of said spherical surface.

13. The valve defined in claim 11 wherein said body is a one-piece structure and wherein said seating surfaces define a part of the interior body surface delimiting said cavity, all of the openings into said cavity are smaller than said elastically deformable member.

14. The valve defined in claim 2 comprising a second elastically deformable sealing lip protruding from said plug structure and defining therewith a second annular groove opening axially in the opposite direction from said first named groove, said first named and second lips and said first named and second grooves being coaxial about a common axis, said second lip being engageable with a further seating surface in said cavity to provide an annular seal surrounding the inner end of the other of said passages, said second lip being compressed and inwardly flexed at least partially into said second groove to provide an initial seal at zero fluid pressure differential, said second groove being in fluid communication with said other passage when said plug structure is in its blocking position, the pressure of fluid entering said second groove being effective to compress said second lip against said further seating surface.

15. The valve defined in claim 14 wherein said first named and second lips terminate remote from their tips in first and second elastically deformable annular heels respectively, said second heel cooperating with the interior body wall surface to provide a secondary seal axially downstream of said first named lip when higher upstream fluid pressure is in said one passage, said first heel also cooperating with the interior body wall surface to provide a secondary seal axially downstream of said second lip when fluid flow through said body is reversed.

16. The valve defined in claim 15 comprising valve means connected to vent the cavity space axially between said first named and second lips to atmosphere.

17. The valve defined in claim 15 wherein the downstream ones of said heels and lips are respectively inwardly distortable and deflectable by build-up of pressure in said cavity to a predetermined amount to provide a fluid flow path for venting said excess pressure into the downstream one of said passages.

18. In a valve having a body formed with fluid inlet and outlet passages opening at their inner ends into a valve plug cavity, a ported ball type plug rotatable in said cavity between positions where it blocks and provides fluid communication between said passages, and an operating stem rotatably extending into said body and being operatively connected to rotate said plug, the improvement comprising an elastically deformable lip positioned on said plug in surrounding relation to the rotational axis of said stem and coacting with said body to provide an annular fluid tight seal surrounding said stem and preventing leakage of fluid between said stem and said body.

19. The valve defined in claim 18 wherein said plug is formed from elastically deformable material and is integral with said lip.

20. The valve defined in claim 19 wherein said lip defines with said plug an annular outwardly opening groove that is concentric with said lip, said lip being deflectable at least partially into said groove by engagement with said interior body wall surface, said groove opening radially away from said stem to receive fluid around the region of said plug disposed outwardly of said lip, the pressure of fluid in said groove being effective to outwardly compress said lip against said interior body wall surface.

21. A valve comprising a one-piece body formed with fluid inlet and outlet passages opening at their inner ends into a valve plug cavity, an elastically deformable, ported, ball type plug rotatable within said cavity between positions where it blocks and provides for fluid communication between said passages, a collar formed integral with said body and protruding into said cavity and into an outwardly opening recess in said plug, and an operating stem journalled in said collar and extending into said recess for operative engagement with said plug for turning said plug between said positions.

22. The valve defined in claim 21 comprising a stop abutment surface rigid with said stem and coacting with the inner end of said collar to limit outward displacement of said stem.

23. In a valve having a body formed with fluid inlet and outlet passages opening at their inner ends into a valve plug cavity, a ported ball type plug structure rotatable within said cavity between positions where it blocks and provides fluid communication between said passages, and an operating stem rotatably extending into said body and being operatively connected to rotate said plug structure between said positions, the improvement comprising a first annular elastically deformable sealing lip protruding from said plug structure and extending in coaxial relation about an axis normally intersecting the longitudinal axis of the port in said plug structure, said lip being engageable with a seating surface in said cavity to provide an annular seal surrounding the inner end of one of said passages when said plug structure is rotated to its fluid blocking position, and a second annular elastically deformable sealing lip positioned on said plug structure in surrounding relation with the rotational axis of said plug structure, said second lip coacting with the interior body surface defining said cavity to provide an annular fluid tight seal circumferentially surrounding said stem to prevent leakage of line fluid between said stem and said body.

24. The valve defined in claim 18 wherein the inner periphery of said lip is defined by an annular groove opening radially outwardly relative to the rotational axis of said stem and being in fluid communication with said cavity.

25. The valve defined in claim 1 wherein said plug structure is supported in said cavity for limited displacement toward and away from the inner ends of said passages under the influence of fluid pressure loads applied to said plug structure when in its fluid-blocking position to enable the pressure of fluid in the other of said passages to urge said plug structure toward the inner end of said one passage for increasing the compression of said lip against said seating surface when the pressure of fluid in said other passage exceeds opposing fluid pressure in said one passage.

26. The valve defined in claim 25 wherein said plug structure comprises an elastically deformable portion from which said lip integrally protrudes, said lip having a heel at its juncture with said elastically deformable portion, and said heel being deformable into said elastically deformable portion when said plug structure is urged toward the inner end of said one passage to enable the spherical periphery of said plug structure to engage said seating surface to further seal against fluid leakage between said plug structure and said body.

References Cited

UNITED STATES PATENTS

| | | | |
|---|---|---|---|
| 2,844,353 | 7/1958 | Gurries | 251—175 |
| 2,852,226 | 9/1958 | Wheatley | 251—175 |
| 3,155,368 | 11/1964 | Shafer | 251—315 X |
| 3,157,382 | 11/1964 | Perry | 251—315 X |
| 3,284,046 | 11/1966 | Allenbaugh | 251—315 |
| 3,348,805 | 10/1967 | Sanctuary | 251—315 |

M. CARY NELSON, Primary Examiner

MICHAEL O. STURM, Assistant Examiner

U.S. Cl. X.R.

251—315